Figure 1:
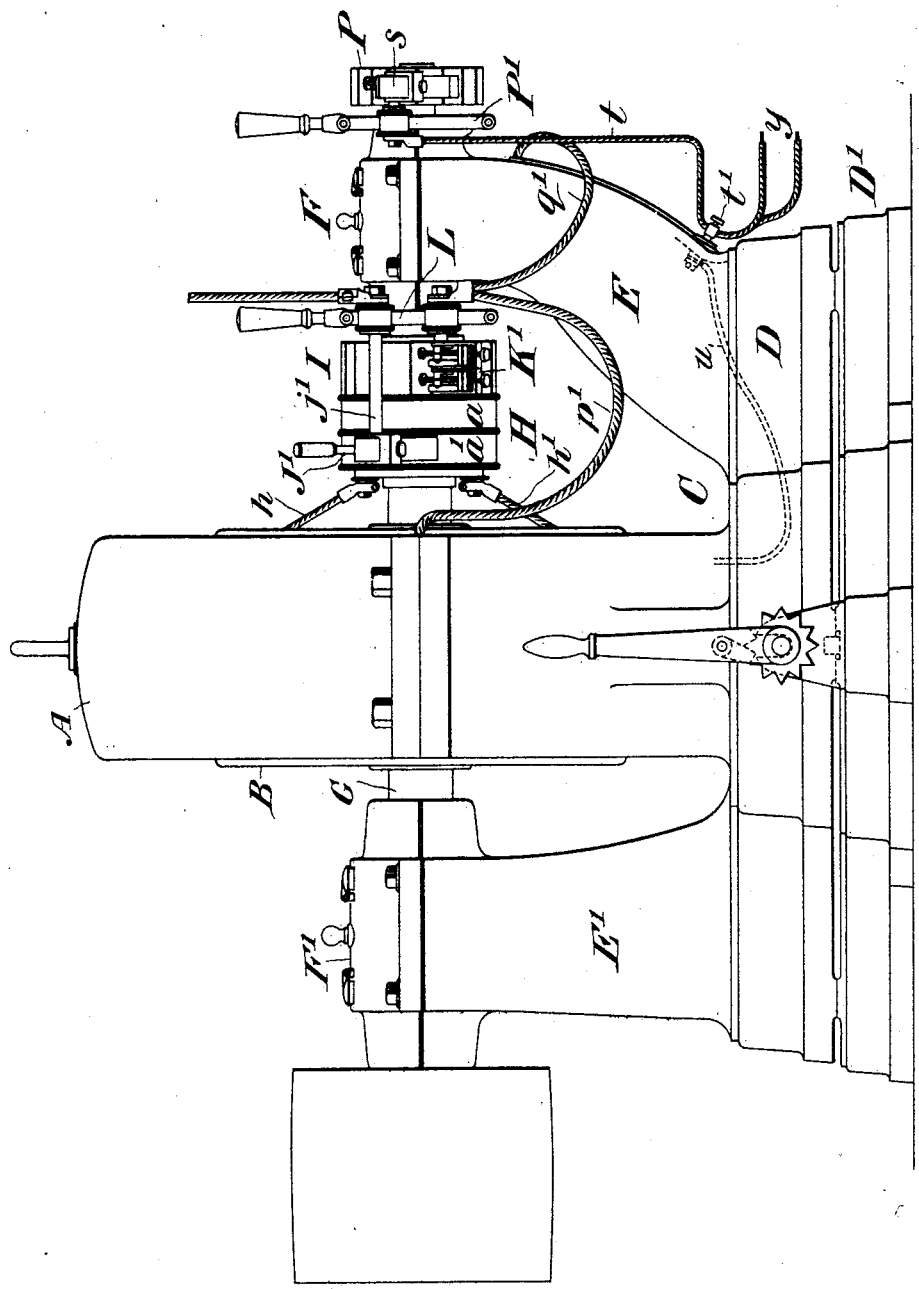

(No Model.) 6 Sheets—Sheet 3.
J. J. WOOD.
ALTERNATING DYNAMO.

No. 514,140. Patented Feb. 6, 1894.

WITNESSES:
C. E. Ashley
I. F. W. Lloyd

INVENTOR:
James J. Wood,
By his Attorneys,
Arthur E. Fraser & Co.

(No Model.) 6 Sheets—Sheet 4.

J. J. WOOD.
ALTERNATING DYNAMO.

No. 514,140. Patented Feb. 6, 1894.

WITNESSES:
C. E. Ashley
H. W. Lloyd

INVENTOR:
James J. Wood,
By his Attorneys,
Arthur E. Fraser & Co.

(No Model.)  6 Sheets—Sheet 5.

J. J. WOOD.
ALTERNATING DYNAMO.

No. 514,140.  Patented Feb. 6, 1894.

WITNESSES:
C. E. Ashley
H. W. Lloyd

INVENTOR:
James J. Wood,
By his Attorneys,
Arthur C. Fraser & Co.

(No Model.) J. J. WOOD. 6 Sheets—Sheet 6.
ALTERNATING DYNAMO.
No. 514,140. Patented Feb. 6, 1894.

WITNESSES:
C. E. Ashley
H. W. Lloyd

INVENTOR:
James J. Wood,
By his Attorneys,
Arthur C. Fraser & Co.

UNITED STATES PATENT OFFICE.

JAMES J. WOOD, OF FORT WAYNE, INDIANA.

ALTERNATING DYNAMO.

SPECIFICATION forming part of Letters Patent No. 514,140, dated February 6, 1894.

Application filed June 20, 1893. Serial No. 478,251. (No model.)

*To all whom it may concern:*

Be it known that I, JAMES J. WOOD, a citizen of the United States, residing at Fort Wayne, in the county of Allen and State of Indiana, have invented certain new and useful Improvements in Alternating Dynamos, of which the following is a specification.

This invention relates to dynamo electric machines, and more particularly to those for generating alternating currents. The machine might be employed for generating pulsatory currents of uniform direction by rectifying the alternating currents, as is well understood.

The novel features of the invention relate, first, to the mounting or arrangement of the resistance in the field regulating shunt between the commutator brushes which is usually employed in compound wound alternators; second, to the construction of the commutator; third, to the construction and mounting of the brush yoke; and fourth, to the means for retaining the field exciting coils in place on the poles of the field-magnet.

The improved dynamo in which my present invention is embodied, and which is illustrated in the accompanying drawings, is of the well known type of alternating dynamos in which the field-magnet consists of a stationary ring with inwardly projecting poles of alternating north and south polarity and wound with exciting coils, and in which the armature is mounted upon the armature shaft and revolves within the multipolar field-magnet, the armature being of the iron-clad type, having as many pole-pieces projecting from its laminated annular core as the number of poles of the field-magnet, and having its pole-pieces wound with coils. Such alternating dynamos commonly have their field-magnets compound wound, that is to say, the poles of the field-magnet carry two coils, one of which called the "main field winding," receives a uniform current for imparting the initial excitation to the field-magnet, while the other, called the "series winding," receives the greater part of the current sent out over the line, in order that when the load on the machine increases the increased volume of current shall build up the magnetization of the field-magnet sufficiently to enable it to maintain the electro-motive force constant at the terminals of the machine. The current while being sent through the series winding is rectified to give it a uniform direction by means of a commutator, to the opposite brushes of which the terminals of the series winding are connected, while between these brushes is a resistance shunt, its resistance being so proportioned to that of the series winding as to take approximately one fifth (more or less) of the current, the other four-fifths or thereabout passing through the series winding. The purpose of this shunt is to form a closed circuit around the series winding constituting a path for the extra current produced in such winding due to the varying magnetization of the poles, and consequently prevent the serious sparking which is liable to occur at the commutator brushes; and also to afford a means for balancing or regulating the machine, since by varying the resistance of this shunt the extent to which the compound winding compensates for the variations in load on the dynamo can be altered, so that with the series winding proportioned to over-compensate for an increase of load, or to "over-compound" as it is technically called, the extent of over-compounding can be reduced to the degree found most desirable for any given character of work to be performed.

My invention provides an improved construction and arrangement by which better provision is made than heretofore for the location and connection of this resistance or field shunt.

In alternating dynamos of the class described, the line current is taken off from collector rings on the armature shaft by means of collector brushes pressing upon these rings. In compound-wound alternators, the commutator for rectifying the currents while traversing the series winding of the field-magnet is also mounted on the armature shaft and pressed upon by commutator brushes.

My invention provides an improved construction of the commutator and collector by which they are so co-related to each other as to simplify their construction and electric connections. It also provides an improved construction for the mounting of the collector and commutator brushes, and for facilitating the removal of the armature and armature shaft by enabling a convenient disconnection of the yoke carrying these brushes.

In the construction of my improved alternating dynamo, my invention seeks to simplify and reduce the number of connections and place them where they will be as much protected and as little visible as possible.

The accompanying drawings illustrate the preferred form and proportions of a dynamo embodying my invention.

Figure 2:
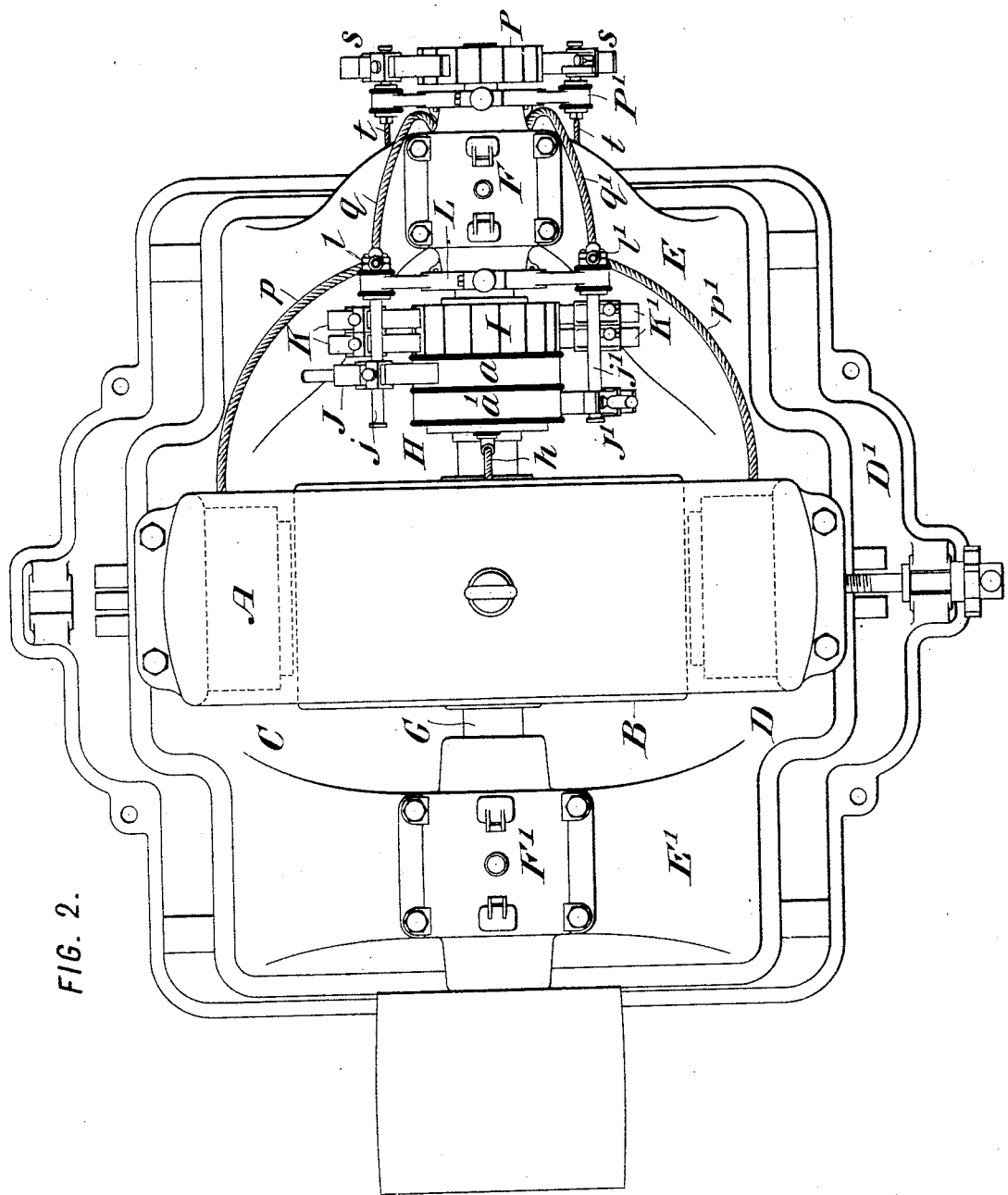
Figure 3:
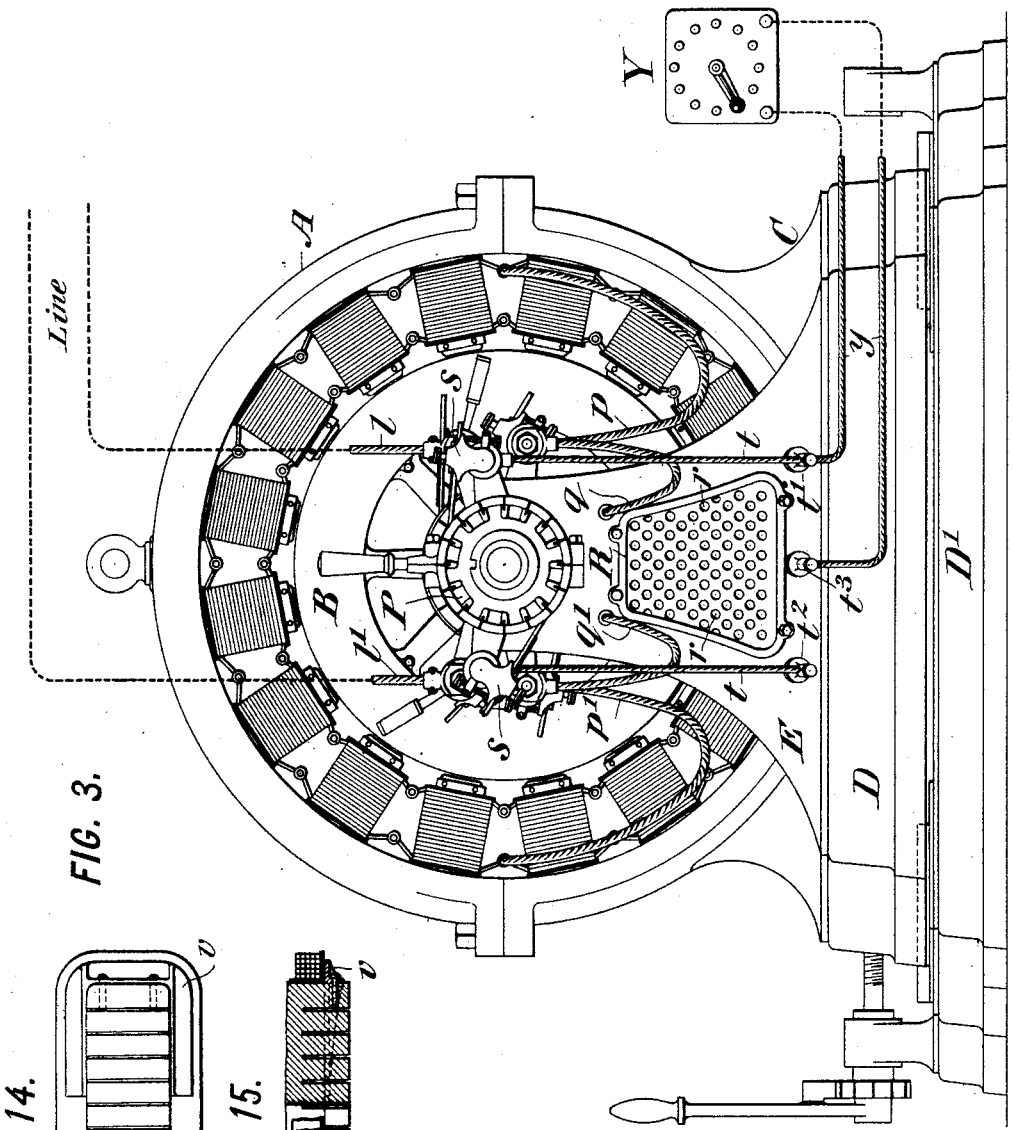
Figure 14:
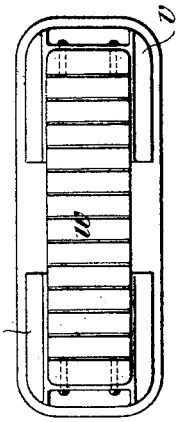
Figure 15:
Figures 4, 6:
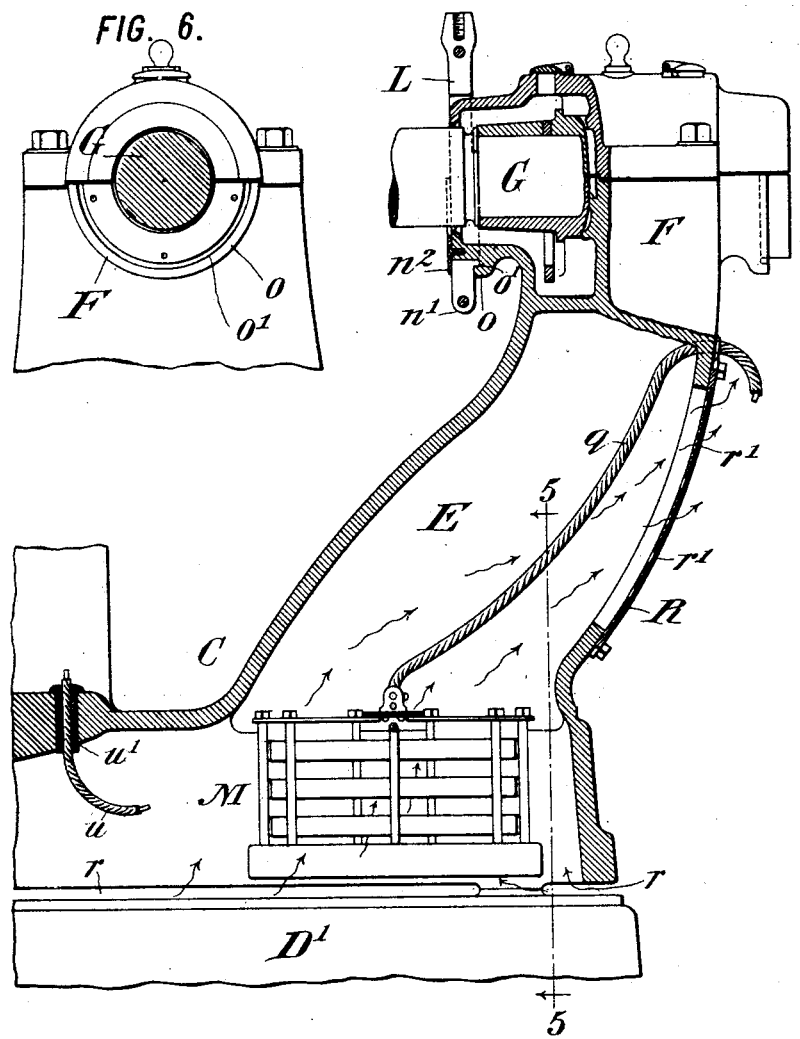
Figure 5:
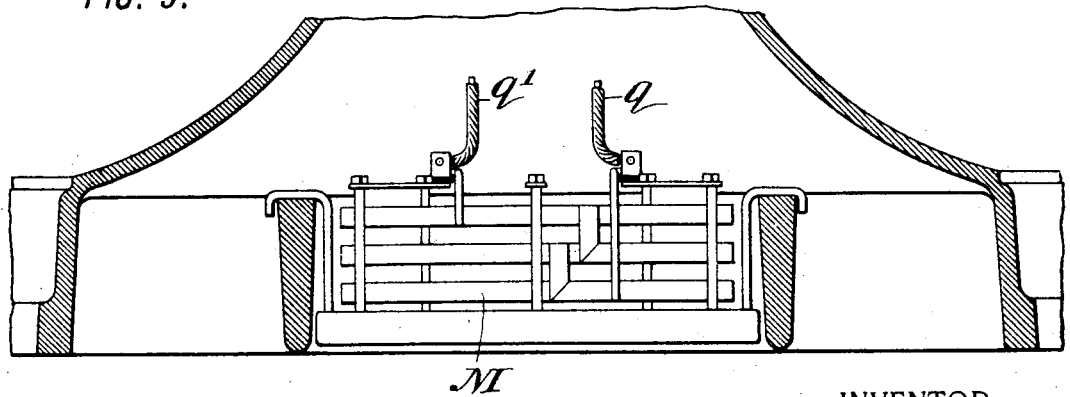
Figure 8:
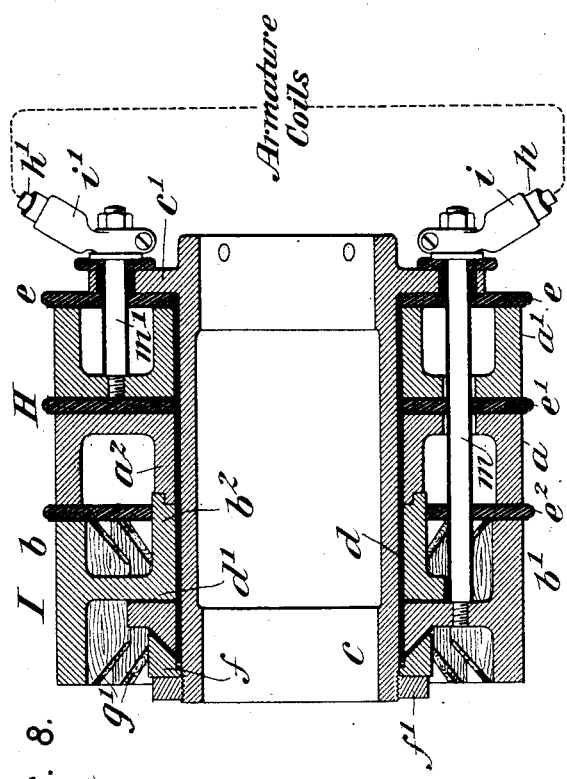
Figure 9:
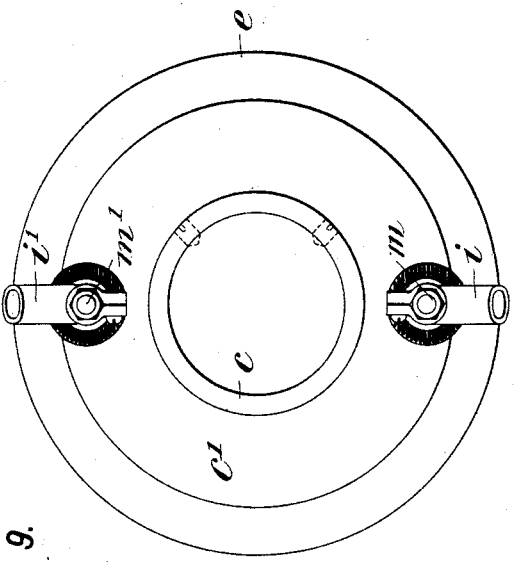
Figure 7:
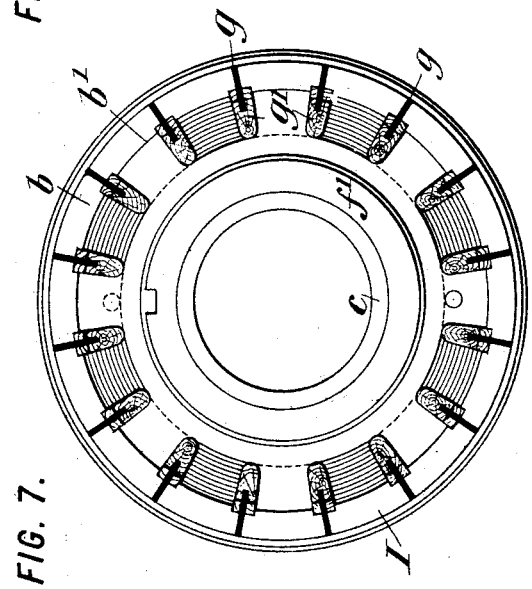
Figure 10:
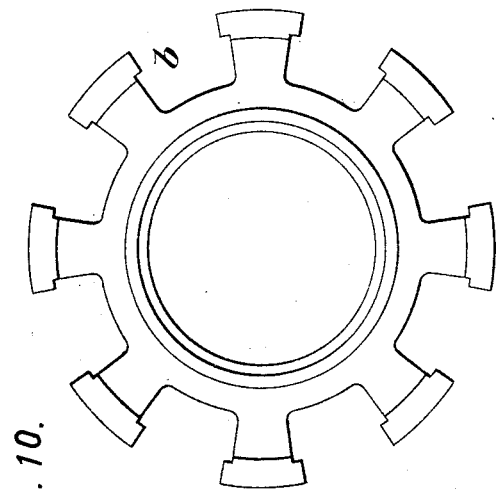
Figure 11:
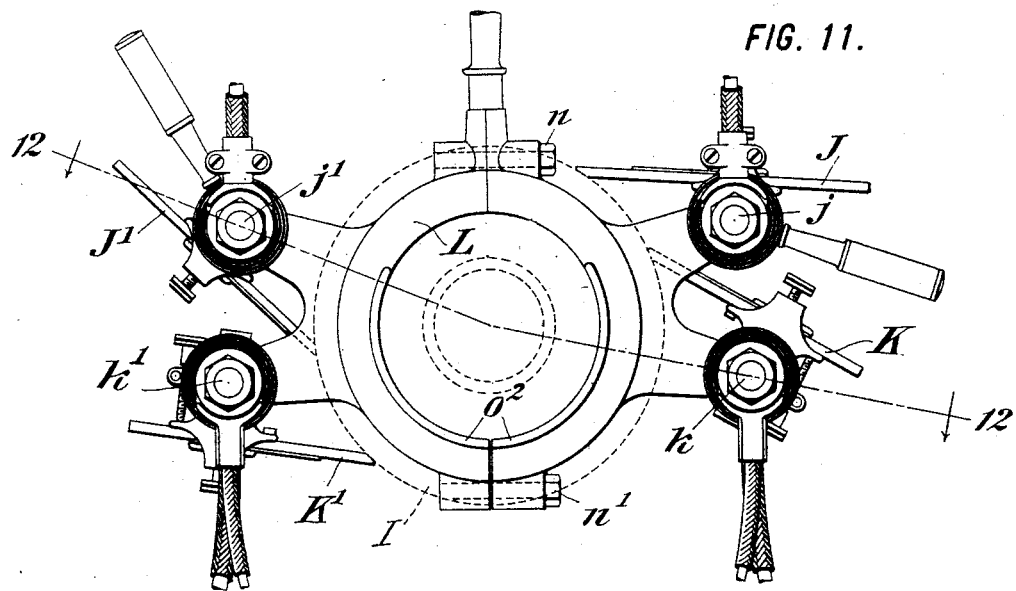
Figure 12:
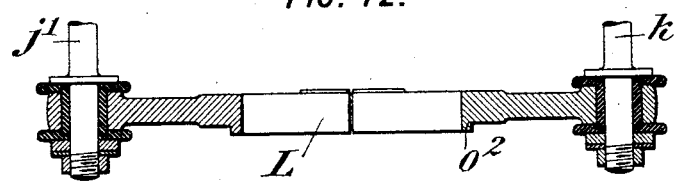
Figure 13:
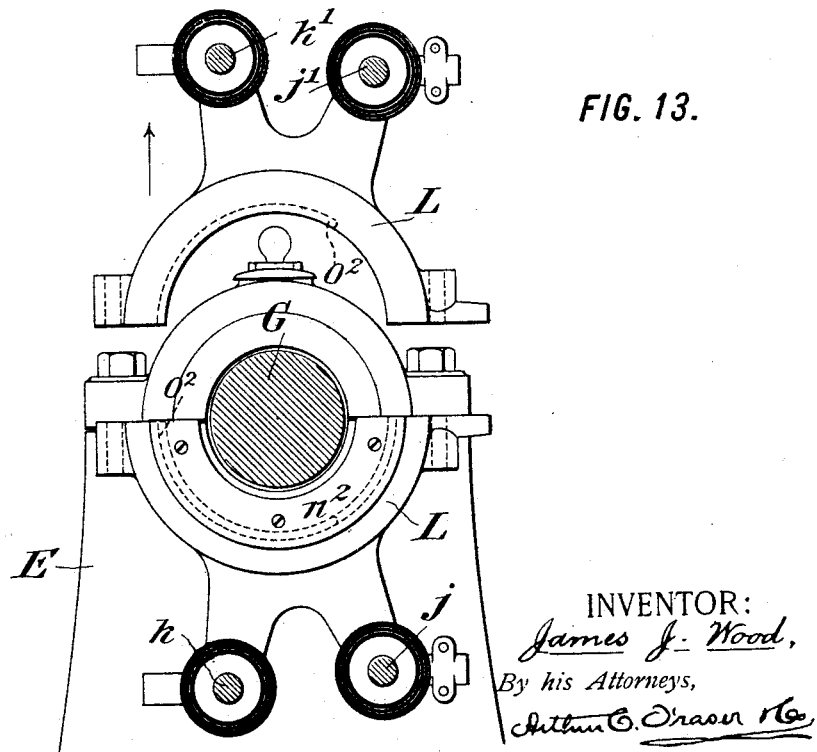

Figure 1 is a side elevation of the dynamo. Fig. 2 is a plan thereof. Fig. 3 is an end elevation of the commutator end of the machine. Fig. 4 is a fragmentary vertical section through one of the bearing pillars, and illustrating the mounting and arrangement of the field shunt resistance. Fig. 5 is a vertical transverse section of the lower part thereof on the line 5—5 in Fig. 4. Fig. 6 is a fragmentary elevation of the inner end of the shaft bearing shown in Fig. 4 on which the brush yoke is supported. Fig. 7 is an elevation of the outer end of the commutator. Fig. 8 is a diametrical section of the commutator and collector. Fig. 9 is an elevation of the inner end of the collector. Fig. 10 is an elevation of the inner half or section of the commutator. Fig. 11 is an elevation of the brush yoke and commutator and collector brushes, viewed from the outer side next the bearing. Fig. 12 is a longitudinal section of this yoke on the line 12—12 in Fig. 11. Fig. 13 is an elevation of the brush yoke and shaft bearing looking from the left in Fig. 4, and showing the yoke displaced and partially removed to admit of the removal of the armature shaft. Fig. 14 is an elevation of the end of one of the field-magnet poles. Fig. 15 is a side elevation of the end portion of one of these poles partly in section.

Referring to the drawings, the field-magnet A is in general of the construction usual in dynamos of this character.

The armature B is or may be also of the same general construction as the armatures commonly employed with dynamos of this class. In the machine shown, however, the armature actually employed is of peculiar and novel construction, which is fully illustrated and described in another application for patent which I have executed for improvements in armatures for dynamos (patented October 24, 1893, No. 507,194).

As the construction of the armature has no relation to those improvements which are herein claimed as of my invention, I do not herein illustrate or describe the peculiar construction of the armature.

The frame of the machine, designated generally by the letter C, consists of a hollow base D, and hollow bearing pillars E and E', which carry the bearings F and F' in which the armature shaft G turns. The field-magnet A is mounted directly upon the base D, preferably by casting its lower half integrally with the base, while the upper half or crown of the field-magnet is cast separately and bolted to it. In the construction shown the pillars E E' are cast integrally with the base, although this is not essential, since the pillars might be separately cast and bolted to the base. The base D is mounted upon a surbase D', which is provided with any suitable means for sliding the base in either direction in order to slacken or tighten the driving belt.

On the armature shaft G are mounted the collector H and commutator I, which are arranged close together, being in fact constructed as one part, as shown in Fig. 8. Bearing upon the opposite rings of the collector are the collector brushes J J', and bearing upon the commutator are twin brushes K K'. These brushes are sustained by a yoke L, from which project four studs, two long studs $j j'$ for carrying the collector brushes, and two shorter studs $k k'$ for carrying the respective commutator brushes. All these studs are insulated from the yoke, and have directly attached to them the several socket pieces forming the terminals of the several conducting wires or cables. The brush yoke L is mounted upon the shaft bearing F, being supported by the lower or fixed half thereof in the manner hereinafter explained.

I will now describe the construction of the commutator and collector with reference to Figs. 7 to 10. The collector consists as usual of two collector rings $a$ and $a'$. The commutator is, as is usual in this class of machines, an interlocking crown commutator consisting of two sections $b$ and $b'$, one of which $b$ is shown separately in Fig. 10, the other being of the same construction with the exception of its hub, and the intermittent outer flanges of the two being interlocked so as to alternate with one another in the manner shown in Fig. 7. The four rings or sections $a a' b b'$ are all mounted upon a single sleeve or hub $c$, as shown in Fig. 8, an insulating bushing $d$ being interposed to keep the several sections out of electrical contact with the sleeve. This sleeve has at one end a flange $c'$, against which is placed an insulating washer $e;$ the collector ring $a'$ is then applied, then another insulating washer $e'$, then the other collector ring $a$, then a third insulating washer $e^2$, and then the sections $b b'$ of the commutator, the hubs of which are insulated from each other by a washer $d'$. A ring $f$ is then applied next the hub of the outer section $b'$ with an interposed insulating washer, and finally a threaded ring or nut $f'$ is screwed on. The two sections of the crown commutator have their segmental rims insulated from each other by mica plates $g g$ held in place by wooden blocks $g'$ in the usual manner (Fig. 7). The insulating washers $e e' e^2$ are preferably made with an inner layer of hard rubber, vulcanite, press-board or other such material, and outer layers of mica.

The armature winding terminates in two cables $h h'$ (Fig. 1) which terminate in conducting socket pieces $i i'$ (Figs. 8 and 9). The socket $i$ is firmly clamped or connected to a conducting rod $m$, which passes through and is insulated from a hole in the flange $c'$, and also passes through openings in the collector rings $a$ $a'$, its end being screwed or otherwise electrically connected to the web of the commutator section $b'$. The intermediate portion of the rod is sheathed with insulating material. The other socket $i'$ is firmly connected to one end of a rod $m'$ which passes through and is insulated from an opposite hole in the flange $c'$, and its end is screwed or otherwise electrically connected to the collector ring $a'$. Thus one terminal of the armature is connected to the commutator section $b'$, and the opposite terminal to the collector ring $a'$. The other collector ring $a$, and the other commutator section $b$ are electrically connected to each other through the medium of their hubs, the hub $a^2$ of the collector ring, and the hub $b^2$ of the commutator section coming into contact, whereby a metallic connection is made frome one to the other. A mere abutting contact would answer this purpose were it not that there is some liability of the relative displacement of the parts due to the shrinkage of the insulating layers or washers, the occurrence of which might separate the abutting hubs, and to provide against this contingency I cause one of the hubs to enter within the other, forming an overlapping joint, as clearly shown in Fig. 8, whereby the contact will be maintained even though the two hubs should be displaced to the greatest extent that can possibly occur.

The circuits are generally the same as in other dynamos of this class. From one terminal of the armature winding the current passes through the cable $h$, socket $i$ and rod $m$ to the commutator section $b'$, thence through one of the commutator brushes, for example the brush K (Fig. 2), and through the stud $k$ thereof, whence the current divides, the greater part flowing through the cable $p$ (Fig. 3) traversing the series winding of the field-magnet, and returning by the cable $p'$ to the stud $k'$ of the opposite commutator brush, while the lesser part of the current traverses the resistance shunt by flowing through cables $q$ $q'$ and the interposed resistance M (Figs. 4 and 5); the reunited current then passing from brush K' to the commutator section $b$, thence through their contacting hubs to the collector ring $a$, thence through collector brush J and its stud $j$ and cable $l$ to the line (see Fig. 3), thence back through cable $l'$, stud $j'$ and collector brush J' to the other collector ring $a'$, and from the latter (see Fig. 8) by the rod $m'$, socket $i'$ and cable $h'$ to the opposite terminal of the armature coils.

In alternating dynamos of this character as heretofore most commonly constructed, the connections between the armature and commutator have been carried through a bore in the shaft, entering and emerging from this bore through lateral holes bored obliquely into the shaft. This construction is defective because of the difficulty and expense of boring out the shaft, and because the shaft is thereby to some extent weakened, and mainly because it is practically impossible to render the connection of the lateral or oblique holes with the bore perfectly smooth, rough edges being consequently left which in time by reason of the vibration of the conducting cables due to their rotation with the shaft, cut through or wear away the insulation of the cables, thereby in time forming a short-circuit between the opposite cables, with the usual result of fusing the armature winding. By my improved construction I place the commutator and collector close to the armature, and arrange the connections wholly outside of the shaft, these connections being only two in number, and consisting of the simple and practical construction of two insulated rods, the one a short one connecting with the inner collector ring, and the other a long rod extending through the collector and armature and connecting with an outer commutator segment. This construction admits of very short cables $h$ $h'$ connecting the armature terminals with these connecting rods, and provides for the arrangement of these cables in radial direction, so that the centrifugal force exerts no injurious effect upon them. The former construction was also disadvantageous because it interfered with the easy removal of the commutator, whereas with my improved construction the commutator and conductor can be easily removed together by simply disconnecting the socket pieces $i$ and $i'$ from the conducting rods $m$ and $m'$, and unfastening the set-screws which hold the sleeve $c$ in place on the armature shaft. Prior to my invention the connection between one of the armature sections and one of the collector rings has been made by wires or rods; as compared with this, my improved construction in bringing the hubs of these two elements together into metallic contact whereby all interposed circuit connections are obviated, is an advantageous improvement.

The brush yoke L is of the construction shown best in Figs. 11, 12 and 13. It consists of a ring, from opposite sides of which project the arms carrying the brush-holder studs $j$ $j'$ $k$ $k'$, these studs being insulated from the yoke in the manner shown in Fig. 12. The yoke is divided in halves in such manner as to leave the arms carrying two of the studs on one half of the ring, and the arms carrying the other two studs on the opposite half of the ring. The two halves are normally united by a screw $n$ (Fig. 11) engaging lugs on one side of the ring, while the lugs on the diametrically opposite side are engaged by a screw $n'$, the principal function of which is to draw together the two lugs which normally are slightly separated, in order thereby to contract the ring and clamp or bind the yoke tightly in place upon its support. As before stated, the yoke is supported on the lower or fixed half of the shaft bearing F. The construction is best shown in Figs. 4 and 6. The lower half of the shaft bearing is formed with a projecting flange $o$ extending over about half the circumference of a circle, and having a groove $o'$ entering it. The inner surface of the ring of the yoke fits over a cylindrical seat formed on the lower half of the bearing, and the yoke is formed with a rib or projecting flange $o^2$ which enters the groove $o'$, the ring of the yoke being held in place on the seat by a flange $n^2$ consisting of a half ring or washer of metal plate fastened against the end of the bearing and overhanging it sufficiently to bear against the face of the ring of the yoke. It will be observed that by this construction the yoke is mounted on the lower or fixed half of the shaft bearing, and is wholly independent of the bearing cap. Consequently the bearing cap can be removed to get access to the bearing without disturbing the yoke. This in itself is not a new feature of my present invention, it being the subject of my Patent No. 477,729, dated June 28, 1892.

The construction introduced by my present invention is designed to facilitate the removal of the armature shaft. To remove the armature and its shaft, the upper half or crown of the field-magnet is detached and lifted out, and the caps of the two bearings are removed. The brush yoke L is then the only thing that interferes with the lifting out of the shaft. By my improved construction the brush yoke can be turned one-quarter revolution to the position shown in Fig. 13, and by disconnecting the screws $n$ and $n'$ the upper half of the yoke can be detached and lifted off, since by turning it to this position that part of the rib $o^2$ which is formed on this half of the yoke has been brought beyond and out of engagement with the arc-shaped groove $o'$ in the lower half of the bearing. The lifting off of this upper half of the yoke thus leaves the shaft free to be lifted out, or if preferred the yoke can be wholly removed by sliding its lower half around to the upper side to disconnect its rib from the groove.

I will now describe the improved mounting of the field shunt. The field shunt consists of the wires or cables $q$ $q'$ and the resistance coil M, the latter being shown only in Figs. 4 and 5. The resistance M may be of any suitable or known construction, and need not be of the particular construction shown in these figures, this special construction being made the subject of a separate application for patent, (patented October 24, 1893, No. 507,345.) It is only essential to this resistance that the resistant conductor of which it is composed shall be so arranged as to leave ventilating spaces or openings through it such as will admit of an upward circulation in order to continually conduct away from it the heat which it disengages. As before stated, the general frame C of the machine is constructed with a base D and bearing pillar E. The base D is made hollow so that it forms a chamber or cavity in which to mount the resistance coil M. Essentially this hollow or cavity may be made in any part of the frame C of the machine, the particular part thereof in which the resistance coil is arranged depending upon the shape or construction of the frame and the shape and dimensions of the coil. In the particular construction shown, and with a coil or resistance of the shape and dimensions shown, both of which I consider preferable for a machine of this character, the best and most convenient arrangement is to place the resistance coil M in the hollow base D, and directly at the bottom of the pillar E, which also is made hollow. A space or opening $r$ is formed or left beneath the base D through which air may enter, and provision is made for exit of air by the formation of openings $r'$ $r'$ communicating with the cavity in the pillar E, as clearly shown, so that as air is heated by contact with the heated coils of the resistance, it may ascend and escape through the upper openings $r'$, fresh cool air to take its place entering beneath through the openings $r$. Thus an upward circulation of air through the resistance coil is caused in the manner indicated by the arrows in Fig. 4. Preferably the openings $r'$ are formed as perforations in a plate R, which closes a large opening in the outer side of the pillar, so that by removing this plate access can be had to the resistance coil M and its connecting cables $q$ $q'$. These cables leading from the opposite terminals of the resistance, pass up on opposite sides of the middle of the pillar to above the plate R, and pass out through holes in the outer face of the pillar, which holes are preferably bushed with insulating material.

The field shunt resistance of machines of this character has always heretofore been mounted on the outside of the base of the machine, or on the switch board of the dynamo room. When mounted on the base it has the disadvantages of occupying room that is otherwise needed, of being unsightly, and especially of being exposed to injury, particularly by being short-circuited by the accumulation of particles of metallic dust from the commutator and elsewhere. When mounted on the switch board, there is the disadvantage that it is necessary to carry two additional high potential wires or conductors from the dynamo to the switch board. By my invention the important advantages are gained that the resistance coil is placed where it occupies no available room, where it is protected from mechanical injury, where it is so covered by the base or frame of the machine that the access of metallic dust to the coil is prevented, since this dust while falling on and around the base is too heavy to rise up under the base, and furthermore, that the coil is more effectually cooled, since it is placed in a ventilating passage or flue through which a continuous draft or current of air is maintained; and finally, the machine is made self-contained by having the resistance coil constructed as a permanent part of the machine, the connections to the coil are shortened, and the connections are made more symmetrical.

In alternating current dynamos, the field-magnets are sometimes excited by a current from a separate exciter, while at other times they are made self-exciting. The machine shown in the drawings is self-exciting. The armature carries an additional winding, the two terminal wires of which are carried through a bore in the armature shaft to the outer end thereof where they are connected to the respective sections of an interlocking crown commutator P, the construction of which is or may be substantially the same as that of the commutator I. The commutator brushes $s$ $s$ of this commutator have their holders carried by a brush yoke P', the construction of which may be identical with that of the yoke L, except that this yoke has only two arms instead of four. The yoke P' is mounted on the outer end of the bearing F, the mounting being the same as that already described with reference to the yoke L. From the opposite brush holder studs two conducting wires or cables $t$ $t$ extend downward and are connected to binding posts $t'$ $t^2$, passing through the shell of the main frame C at any suitable locations. Between these, or otherwise arranged, is a like binding post $t^3$. To the binding posts $t'$ and $t^3$ (or in any other arrangement) are connected wires $y$ $y$ leading to the opposite binding posts of a rheostat Y (Fig. 3) located usually on the switch board, the purpose of which rheostat is to introduce more or less resistance into the main field exciting circuit and thereby control the excitation of the field-magnet. To the inner ends of the binding posts $t^2 t^3$ are permanently connected the ends of cables $u$ $u$, one of which is shown by dotted lines in Fig. 1, which extend within the hollow or cavity of the frame, and pass up through insulating bushings $u'$ (Fig. 4) to where they connect with the terminals of the main field exciting winding. By thus carrying these connections through the hollow frame or base, they are protected from injury, and are placed where they are out of the way and concealed from view. Thus the field exciting circuit extends from one of the brushes $s$ by wire $t$ to post $t'$, thence by wire $y$ through rheostat Y, returning by the other wire $y$ to post $t^3$, extending thence through one of the inner cables $u$, thence through the series of main field-magnet coils, and back by the other cable $u$ to the binding post $t^2$, and by the other wire $t$ to the opposite commutator brush $s$.

My invention provides a novel construction for holding the exciting coils in place upon the inwardly projecting poles of the field-magnet. Heretofore it has been customary to provide for this purpose a metal ring conforming in shape to the pole-piece so as to slip over its end, and resting against the spool or terminal insulating washer of the field-magnet coil, being fastened to the pole-piece by screws, pins or otherwise. This construction has the disadvantages, first, of forming a closed electric circuit around the pole-piece of infinitely low resistance so that the magnetic pulsations induced in the pole-piece induce alternating currents of immense volume to traverse the ring whereby it is heated; and second, the expansion and contraction of the ring due to the heat generated in it, and to the heat of the pole-piece, being usually in a different ratio from those of the pole-piece itself, the screws or other means by which the ring is attached to the pole-piece are liable to be injured or broken. The first of these difficulties has heretofore been practically overcome by leaving so wide a polar gap between the field-magnet poles and the armature as to keep down the inductive pulsations of magnetism in the field-magnet poles sufficiently to suppress any excessive heating of the rings by the formation of electrical currents within them, but this is done at the expense of interposing a high magnetic resistance between the field-magnet and armature by which the efficiency of the machine is reduced.

According to my present construction I interrupt the continuity of the closed circuit heretofore formed by the ring, by making a break or parting therein on at least one side, and preferably on both sides, of each pole-piece. The ring is thus reduced to two U-shaped plates which straddle respectively the front and rear sides of the pole piece with their legs extending along the sides of the pole-piece toward the middle thereof, but without coming into contact with each other. This construction is best shown in Figs. 14 and 15. On the inner end of each pole $w$ are fastened two U-shaped plates $v$ $v$, which are fastened against the front and rear sides of the pole piece with their legs projecting along the sides of the pole piece toward the middle thereof, and sufficiently to afford the necessary support to the insulating washer which constitutes the outer portion of the spool or support within which the coil is wound. These plates $v$ $v$ are made of L-shape in cross-section, having each an outer flange for bearing against the spool, and an inner flange for resting against the end of the pole piece, this inner flange being fastened to the pole piece by screws as shown. The preferred shape and construction of these plates are clearly indicated in Figs. 14 and 15. They constitute a simple, effective and easily applied means for holding the field-magnet coils in place. The two plates being wholly distinct from each other and fastened solely to the opposite sides of the pole-pieces, are free to move toward and from each other with the expansion and contraction of the pole-piece so that their attachment thereto cannot be impaired by any inequalities of expansion or contraction. The two plates constitute an ample support for the winding without forming a closed metallic circuit, and consequently without being heated by induced currents generated in them. This gives the advantage of enabling the magnetic gap to be reduced to as narrow a space as is admissible for the mechanical clearance of the armature in revolving within the poles, whereby the magnetic resistance is greatly decreased and the efficiency of the machine is correspondingly augmented.

I claim as my invention the following-defined novel features, substantially as hereinbefore specified, namely:

1. In a compound-wound alternating dynamo having a resistant shunt between the brushes of the rectifying commutator which feeds the series field winding, the combination of the fixed frame of the machine constructed as a hollow shell affording an internal chamber, and the resistance of said shunt arranged in said chamber, whereby it is protected from mechanical injury and from the deposit of metallic dust.

2. In a compound-wound alternating dynamo having a resistant shunt between the brushes of the rectifying commutator which feeds the series field winding, the combination of the fixed frame of the machine constructed as a hollow shell affording an internal chamber, with openings above and below to permit an upward circulation of heated air through said chamber, and the resistance of said shunt arranged in said chamber, whereby it is protected and is efficiently cooled by the upward current of air.

3. In a compound-wound alternating dynamo having a resistant shunt between the brushes of the rectifying commutator which feeds the series field winding, the combination of the fixed frame of the machine constructed as a hollow shell affording an internal chamber or passage extending from the base up through one of the bearing pillars, with an opening at the base for entrance of air and an opening in the upper part of the pillar for escape of air, and the resistance of said shunt arranged in said chamber and in the path of a current of air between said openings, whereby it is kept cool by the upward draft of air heated by the coil.

4. In a compound-wound alternating dynamo having a resistant shunt between the brushes of the rectifying commutator which feeds the series field winding, the combination of the fixed frame of the machine constructed as a hollow shell affording an internal chamber or passage extending from the base up through one of the bearing pillars, and the resistance of said shunt arranged in said chamber, with the connecting wires or cables of said shunt extending from the terminals of said resistance upward to and through holes in said pillar and thence to opposite sides thereof, and terminating in connections with the opposite brushes of said commutator, whereby the connections are arranged symmetrically, without crossing, and the conductors of opposite potential are extended in opposite directions to their connection with the opposite brushes.

5. In a dynamo, the construction of the brush-yoke in halves bolted together, the yoke being rotatively mounted by engagement with the lower half of a shaft-bearing, whereby to lift off the armature-shaft the bearing cap can be taken off and one half of the yoke can be removed, leaving the other half of the yoke on its mounting.

6. In a dynamo, the combination of the brush-yoke and the shaft-bearing carrying it, the former constructed with a divided ring having a projecting rib extending concentrically part way around it, and the lower half or fixed part of the bearing constructed to support said ring and with a groove receiving said rib, the bearing cap being out of engagement with said ring, whereby the yoke may be oscillated by sliding its ring around on said bearing until the part of the rib formed on one half of the ring passes out of engagement with said groove, and this half may then be disconnected and removed.

7. In an alternating dynamo, a commutator and collector arranged side by side, with electrical connections between the outer collector ring and one terminal of the armature winding, and between the other terminal thereof and the outer commutator section, and the hubs of the inner commutator section and inner collector ring constructed in metallic contact to afford an electric connection between them.

8. In an alternating dynamo, a commutator and collector arranged side by side, with electrical connections between the outer collector ring and one terminal of the armature winding, and between the other terminal thereof and the outer commutator section, and the hubs of the inner commutator section and inner collector ring constructed with overlapping joints making a conductive connection with each other independent of some degree of relative displacement.

9. In an alternating dynamo, the combination with the field-magnet poles and coils of a fastening for retaining the coils in place consisting of metallic rings fastened to the end-portions of the poles, against the coils, said ring formed with interruptions to break the otherwise closed circuits formed through them, and thereby prevent their being heated by induction.

10. In a dynamo, the combination with the field-magnet poles and coils, of a pair of U-shaped plates $v$, fastened against the front and back of the poles, with their legs extending along the sides thereof to support the coils.

In witness whereof I have hereunto signed my name in the presence of two subscribing witnesses.

JAMES J. WOOD.

Witnesses:
ARTHUR C. FRASER,
GEORGE H. FRASER.